United States Patent [19]

Krummheuer et al.

[11] Patent Number: 5,581,856
[45] Date of Patent: Dec. 10, 1996

[54] PROCESS FOR THE PRODUCTION OF UNCOATED TECHNICAL FABRICS WITH LOW AIR PERMEABILITY

[75] Inventors: Wolf Krummheuer, Wuppertal; Hans A. Graefe, Schwelm; Volker Siejak, Duisburg, all of Germany

[73] Assignee: Akzo N.V., Velperweg, Netherlands

[21] Appl. No.: 455,253

[22] Filed: May 31, 1995

Related U.S. Application Data

[63] Continuation of Ser. No. 155,182, Nov. 22, 1993, abandoned, which is a continuation of Ser. No. 640,816, Jan. 14, 1991, abandoned.

[30] Foreign Application Priority Data

Jan. 12, 1990 [DE] Germany ............... 40 00 740.5
Dec. 13, 1990 [DE] Germany ............... 40 39 811.0

[51] Int. Cl.$^6$ .............. D06C 21/00; B60R 21/16
[52] U.S. Cl. .............. 26/18.5; 26/18.6; 280/728.1
[58] Field of Search .............. 26/18.5, 18.6; 8/151.2, 154, 155, 155.1, 155.2; 280/728, 243, 728 R; 242/142, 145; 244/113

[56] References Cited

U.S. PATENT DOCUMENTS

| | | | |
|---|---|---|---|
| 1,269,340 | 6/1918 | Vanderkleed et al. | 8/151.2 |
| 2,178,743 | 11/1939 | Dreyfus et al. | 28/182 |
| 2,267,117 | 12/1941 | Mann | 8/151.2 |
| 2,276,605 | 3/1942 | Andrews | 26/18.5 |
| 2,365,931 | 12/1944 | Berger | 26/18.5 |
| 2,377,434 | 6/1945 | Lyem | 26/18.5 |
| 2,916,348 | 12/1959 | Cresswell | 8/151.2 |
| 3,058,702 | 10/1962 | Sharples et al. | 244/113 |
| 3,166,824 | 1/1965 | Fuhr | 26/18.6 |
| 3,228,745 | 1/1966 | Galatioto | 26/18.5 |
| 3,235,932 | 2/1966 | Jones | 26/18.5 |
| 3,799,574 | 3/1974 | Bonn et al. | |
| 3,842,583 | 10/1974 | Gage | 57/140 R |
| 3,862,822 | 1/1975 | Schiffer | 8/154 |
| 3,888,504 | 6/1975 | Bonn et al. | |
| 3,915,632 | 10/1975 | Troope et al. | 26/18.5 |
| 3,978,696 | 9/1976 | Ito et al. | 26/18.5 |
| 4,445,903 | 5/1984 | Minemura et al. | |
| 4,517,818 | 5/1985 | Sando et al. | |
| 4,559,975 | 12/1985 | Stits | 139/420 R |
| 4,582,747 | 4/1986 | Hirakawa et al. | |
| 4,590,121 | 5/1986 | Mahr | 428/258 |
| 4,921,735 | 5/1990 | Bloch | |
| 4,945,952 | 8/1990 | Vohringer | 139/383 |
| 5,025,537 | 6/1991 | Green | 26/18.5 |
| 5,093,163 | 3/1992 | Krummheuer et al. | 280/728 |

FOREIGN PATENT DOCUMENTS

| | | | |
|---|---|---|---|
| 974745 | 9/1975 | Canada . | |
| 0085972 | 8/1983 | European Pat. Off. . | |
| 80880 | 2/1970 | German Dem. Rep. | 26/18.5 |
| 16-11148 | 6/1941 | Japan . | |
| 0204967 | 11/1984 | Japan | 26/18.5 |
| 60-25775 | 2/1985 | Japan . | |
| 63-105139 | 5/1988 | Japan . | |
| 1-44832 | 9/1989 | Japan . | |
| 3167312 | 7/1991 | Japan | 280/728 |
| 1444057 | 7/1976 | United Kingdom | 26/18.5 |

OTHER PUBLICATIONS

ICI Dyeing, Finishing and Fabric Care Manual: Dyeing and Finishing of Woven Fabrics Containing Terylene or Nylon Filament Yarns (date unavailable).

Koch, P. A. and Satlow, G., *Grosses Textil–Lexikon*, Band A–K, Stuttgart, 1965, pp. 599–600.

Piller, B., "Neue Technologien zur Verarbeitung von speziellen Chemiefasern in der Textil–,besonders der Maschenwarenindustrie, Melliand Textilberichte", 1975, pp. 618–625.

British Standard Aerospace Series F 126:1980: Specification for 35 g/m$^2$ nylon parachute fabric.

Bardhan, M. K., "Effect of Weaving and Processing Parameters on Fundamental Properties of Nylon Parachute Fabric", *Man–made Textiles in India*, May, 1979, pp. 229–243.

Eurofabric 89, Sep. 28/29, 1989.

Allied Signal Inc. Brochure, "Broad Woven Products" (date unavaiable).

"Air Bag Fabrics", Chemiefasern/Textilindustrie, vol. 39/91 (Industrial Textiles), May 1989, p. E 68.

Fisher Body Material Specification, Apr. 21, 1977, pp. 1–6.

Allied Signal Inc. Brochure, "Broad Woven Applications" (date unavailable).

Allied Corp. Catalogue, "Industrial Yarns", 1981.

Peter, M. and Rouette, H. K, "Grundlagen der Textil Veredlung", 1989, pp. 452–453.

Primary Examiner—Bibhu Mohanty
Attorney, Agent, or Firm—Oliff & Berridge

[57] ABSTRACT

Uncoated technical fabric is produced in a dense weave with low air permeability. The fabric contains polyamide filament yarns with a hot air shrinkage of 6 to 15% (determined at 160° C.) and has an at least substantially symmetrical fabric construction. The fabric is adjusted to the required air permeability by a treatment in an aqueous bath at 60° to 140° C.

16 Claims, 2 Drawing Sheets

PROCESS FOR THE PRODUCTION OF UNCOATED TECHNICAL FABRICS WITH LOW AIR PERMEABILITY

This is a Continuation of application Ser. No. 08/155,182 filed Nov. 22, 1993, now abandoned, which in turn is a Continuation of application Ser. No. 07/640,816 filed Jan. 14, 1991, now abandoned.

TECHNICAL FIELD

This invention relates to a process for the production of technical fabrics in a dense weave.

BACKGROUND

The permeability to air is of major importance for the functioning of many technical fabrics for parachutes or sailcloth. It is particularly relevant to air bags. Such technical fabrics are known to skilled artisans. The low permeability to air required of these fabrics has hitherto been obtained by the application of a coating.

A significant disadvantage to the use of coated fabrics, which applies particularly for the production of air bags, is that a coated fabric has a volume when folded at least 10% higher than that of an uncoated fabric. The space required for accommodating the air bag, for example in a steering wheel, is thus greater for a coated fabric than for an uncoated fabric. One particular disadvantage arises from the necessity to cover the coating with talc to prevent the coatings which are in contact with one another in the folded air bag from sticking together. The talc escaping from the air bag when the air bag function is released then causes discomfort to the passengers. Moreover, air bags of uncoated fabrics have a much lower mass than those of coated fabrics so that the steering wheel is easier to handle.

It has therefore been attempted to avoid the necessity of applying a coating. One possible solution for air bag fabrics is proposed in EP-A 314,867, in which the air permeability is adjusted to the required low value by successive shrinkage, thermofixing and calendering. These treatment stages constitute a finishing process which is not only very inconvenient but also costly. Moreover, the fabric described in EP-A 314,867 is hardly suitable for the production of air bags since the asymmetric fabric structure provided (different thread counts in warp and weft) cannot meet the demand of motor car manufacturers for equal strength in both thread directions. This is a necessary condition since the radially symmetrical air bag structure has no preferential direction.

Another solution is proposed in Canadian Patent No. 974,745. In this case, asymmetric fabrics with a very dense weave produced from heat shrinkable synthetic fiber yarns are subjected to a dry heat treatment, preferably in a tentering frame. Apart from the high energy costs, the fabrics described here also fail to meet the demand of motor car manufacturers for equal strength in warp and weft in air bags on account of the chosen asymmetric fabric structure.

A process for the production of fabrics using extremely high shrinking polyester fibers is described in EP-A 336,507. The shrinkage is permitted and the fabric structure made dense for adjustment to a low permeability to air and water by means of a wet treatment followed by a thermofixing treatment. This process may also be used for technical fabrics, but it is unsuitable for most articles in this field, especially for air bag fabrics, as the high shrinkage polyester yarns used are not sufficiently strong for technical fabrics.

Moreover, the thermofixing process increases the production costs and even has an adverse effect on the air permeability.

The problem therefore arose of developing an inexpensive process for the production of technical fabrics which would not only provide the required air permeability but also fulfill the requirement for strength in these fabrics. Such fabrics are of particular interest for air bags.

The term "air bag fabrics" is used hereinafter to denote in particular the fabrics for the contact part of the two-part air bag, which are required to have a particularly low air permeability of <10 l/dm$^2$.min at 500 Pa test difference pressure. The two-part air bag has a filter part of higher air permeability to enable the air flowing into the air bag on release of the air bag function to escape. In a one-part air bag, openings are punched into the air bag to enable the air to escape. The required low air permeability in this case applies to the entire fabric used for the air bag.

SUMMARY OF THE INVENTION

A fabric of the type described above composed of polyamide filament yarns having a hot air shrinkage of 6–15% (determined at 160° C. according to ASTM D4974) and an at least substantially symmetrical dense fabric structure is subjected to a treatment in an aqueous bath in a temperature range of from 60° to 140° C. These conditions result in shrinkage which leads to a further increase in density of the fabric which was already densely woven and hence to substantial closure of the pores of the fabric. The fabric can by these means be adjusted to the low air permeability of <10 l/dm$^2$.min at 500 Pa test difference pressure demanded in the specifications of motor car manufacturers.

DETAILED DESCRIPTION OF THE PREFERRED EMBODIMENTS

Figure 1:
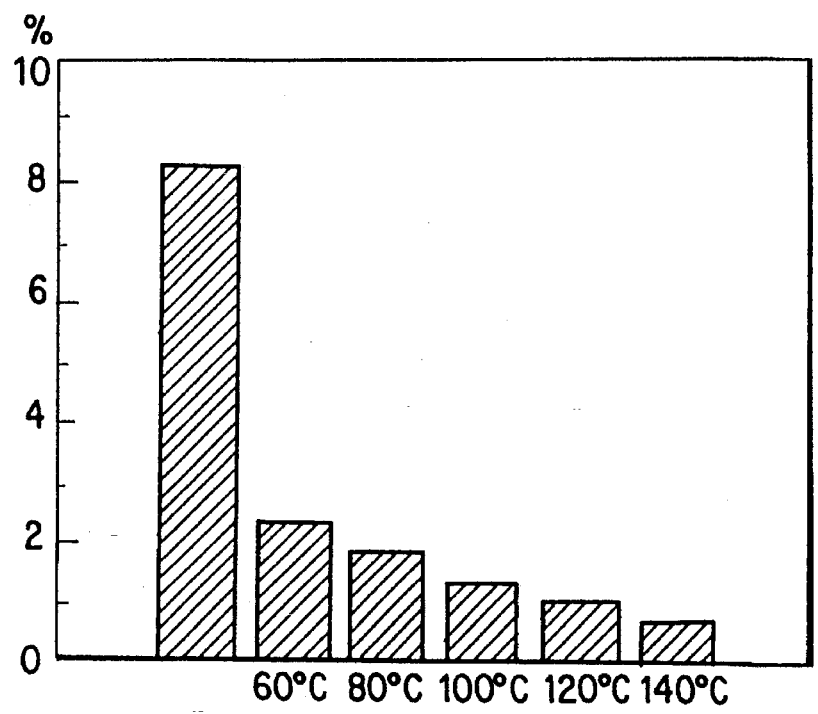
FIGS. 1–3 show the influence of the temperature employed for the wet treatment on shrinkage and the influence of the drying temperature on air permeability.

For the treatment in the aqueous bath, a temperature range of from 90° to 100° C. is particularly preferred as it has been found to be particularly suitable for the required low air permeability. This temperature range has the advantage that it imposes less restrictions on the choice of machinery for the wet passage than temperatures above 100° C.

Even at temperatures of 60° C. and lower, the treatment in the aqueous bath releases marked shrinkage and hence an increase in the density of the fabric, which in turn leads to a reduction in the air permeability. The air permeability may even be controlled by the choice of treatment temperature. This is particularly important since for some applications of technical fabrics, e.g. for the filter part of air bags, the air permeability is required to be higher, for example in the region of 40 to 80 l/dm$^2$.min at 500 Pa test difference pressure. The air permeability of fabrics can thus be adjusted to the desired value by the treatment temperature in the aqueous bath in combination with the chosen fabric structure.

The treatment in the aqueous bath may be carried out, for example, in any machines available for open width washing used for textile finishing. Open width washing machines have proved to be suitable but jigs are also suitable for such treatments.

When temperatures above 100° C. are employed, an HT jig may be used, which may be operated at treatment temperatures of up to 140° C.

This wet treatment also removes any sizing which may have been applied before weaving. This is advantageous in that it prevents bacterial decay of technical fabrics which are sometimes stored for a very long time, e.g. air bags stored in the steering wheel of a motor vehicle.

Even when the warp contains twisted yarns, which are normally used without sizing, the treatment in the aqueous bath is advantageous in that it removes any finishing left on the yarn from the process of fiber production.

The treatment time to be chosen for the wet passage and any additives to the bath depend on the sizing or finishing to be removed and are easily determined by those skilled in the art.

The process described here has the advantage of enabling fabrics with low air permeability to be produced very simply and inexpensively.

The fabrics are preferably dried at 130° to 170° C. in machines conventionally used for this purpose. A drying temperature of 150° C. is preferably employed. The residual moisture after drying is about 5%.

Care must be taken in the drying process to ensure that the residual moisture does not fall below about 5%. If temperatures higher than 150° C. are employed, there is a risk of excessive drying and indeed thermofixing may set in if the dwell times are prolonged. In that case the permeability of the fabrics to air increases. The dwell time for drying must therefore be reduced when temperatures above 150° C. are employed.

Although lower drying temperatures do not entail the risk of increase in air permeability, the resistance to aging may be problematic.

FIG. 1 shows on a graph the residual shrinkage of a polyamide 6.6 yarn which has been treated at various temperatures by the process according to the invention. The residual shrinkage was measured as hot air shrinkage at a treatment temperature of 160° C. The temperatures of the wet treatments are entered along the abscissa at temperature intervals of 20° C. The residual shrinkage is entered along the ordinate. The graph shows that the high initial shrinkage of 8.3% (lefthand column on the graph) is very greatly reduced even at a treatment temperature of 60° C. and continues to decrease with increasing temperature of the wet treatment.

Figure 2:
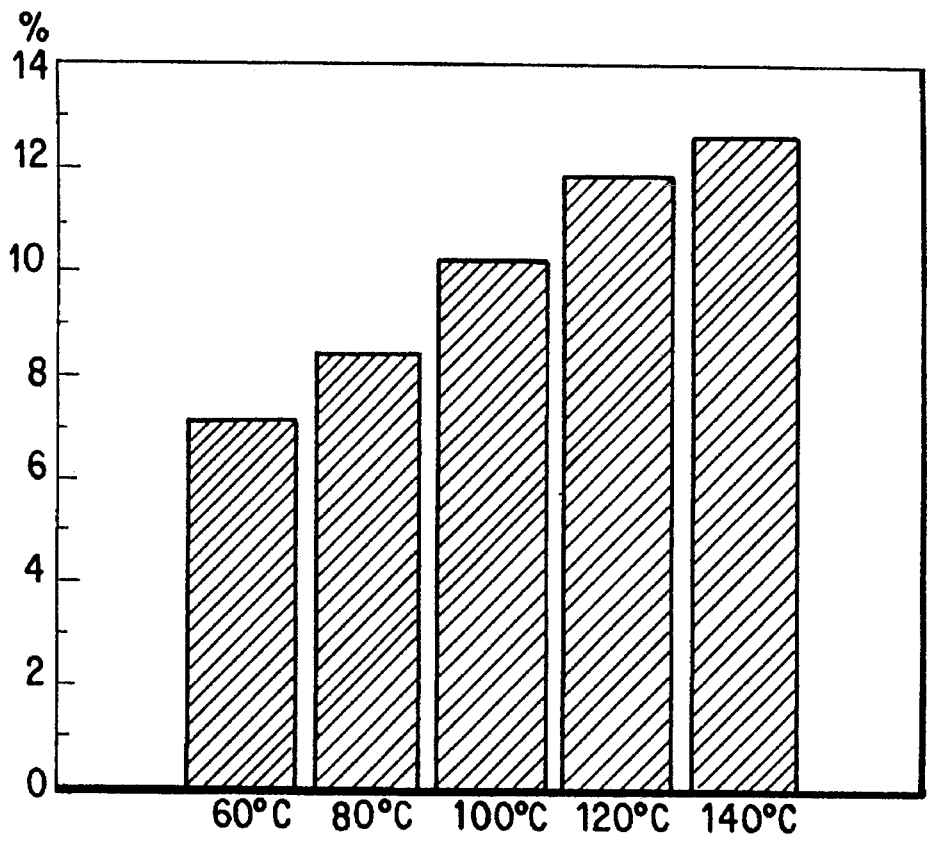

FIG. 2 shows the release of shrinkage obtained in the wet treatment. The treatment temperatures are entered along the abscissa at intervals of 20° C. and the shrinkage released is entered along the ordinate. The percentages given are based on the initial length.

Figure 3:
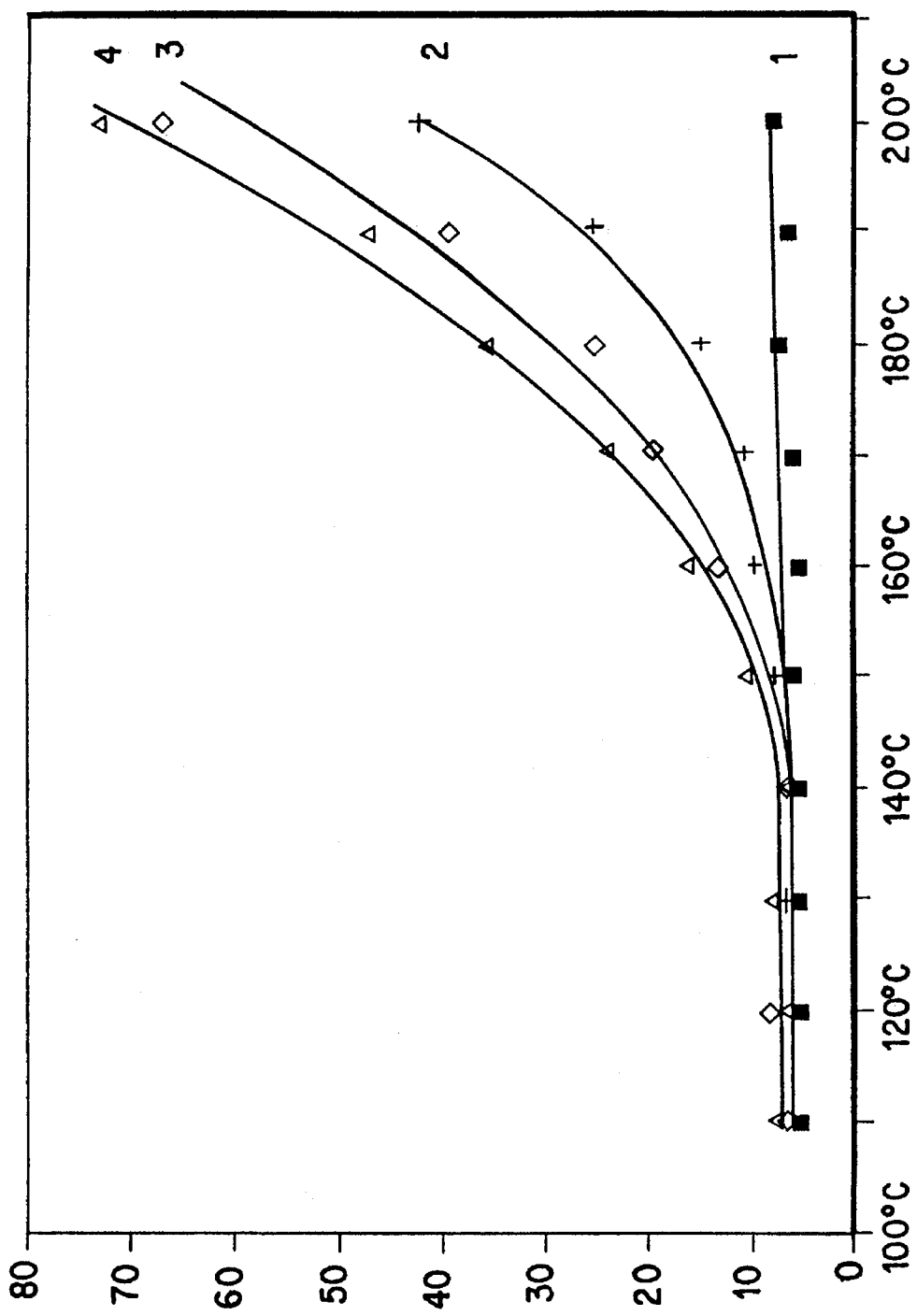

FIG. 3 illustrates the influence of the drying temperature on air permeability. The drying temperatures are entered along the abscissa and the air permeabilities are entered along the ordinate in l/dm$^2$.min (at 500 Pa test difference pressure). The treatment times were 15 seconds in line 1, 30 seconds in line 2, 45 seconds in line 3 and 60 seconds in line 4. FIG. 3 clearly shows that regardless of the drying temperature, low air permeability values are obtained with a short treatment time, whereas with longer treatment times, especially at higher temperatures, thermofixing sets in, leading to a distinct increase in air permeability. This proves that the thermofixing recommended in the present state of the art is a harmful process for fabrics which are required to have a low air permeability.

The described treatment in the aqueous bath enables the required low air permeability of $\leq 10$ l/dm$^2$.min to be completely achieved. The test for air permeability was carried out in accordance with DIN 53 887, with the only modification being that the test difference pressure was raised to 500 Pa in order that a clear test signal would be obtained in the fabrics produced according to the invention.

Measurements carried out on various samples of fabrics produced values from 3 to 9 l/dm$^2$.min at 500 Pa test difference pressure after the treatment described. These values are thus considerably below the maximum limit of 10 l/dm$^2$.min at 500 Pa difference pressure permitted for air bags by motor car manufacturers.

The fiber material used for the production of the fabrics described here may be any polyamide fiber with which the required strength values can be achieved. The polyamide fibers are used in the form of filament yarns. Polyamide 6.6 has proved to be particularly suitable, but other synthetic fibers having a shrinkage behavior similar to that of the polyamides may also be used. Bicomponent fibers may be used for this purpose too.

Yarn titres of 230–940 dtex have been found to be very suitable for technical fabrics. Titers of 235, 350 or 470 dtex are used particularly for air bags. The number of individual filaments may, for example, be 36 for a titre of 235 dtex or 72 for a titre of 350 or 470 dtex.

The yarn used for the production of the fabric preferably has a strength of at least 60 cN/tex and an elongation of 15–30% for a hot air shrinkage of 6–15% (determined at 160° C.).

As already mentioned, the fabric must be adjusted to a high density during the weaving process in the interest of low air permeability. The following thread counts have proved to be suitable for a linen weave:

| Yarn titre | Thread count/cm |
| --- | --- |
| 235 f 36 | 26–30 |
| 350 f 72 | 18–28 |
| 470 f 72 | 18–25. |

The fabrics are preferably produced in a linen weave with symmetrical structure. For finer titres, a Panama weave 2/2 with symmetrical structure may be used in the interest of obtaining a more pleasant handle. In that case, thread counts of 25–36/cm are employed for a titre of 350 f 72 and thread counts of 32–40/cm are used for a titre of 235 f 36.

Symmetrical construction of the fabric means that the warp and weft have at least substantially the same thread counts and the warp threads and weft threads have at least approximately the same textile properties such as titre, strength, elongation at break and hot air shrinkage. The symmetrical construction of the fabric is a simple means of fulfilling the requirement for equal strength in warp and weft. Motor car manufacturers particularly stipulate this requirement for air bags since an air bag is a radially symmetrical structure without preferential direction.

The required values for air permeability may easily be achieved by the procedure described, as clearly shown in the following Table:

| Experiment No. | 1 | 2 | 3 | 4 |
|---|---|---|---|---|
| Yarn titre | 350 f 72 | 470 f 72 | 470 f 72 | 350 f 72 |
| Fabric weave | linen | linen | linen | Panama 2/2 |
| *Fabric fresh from loom:* | | | | |
| Thread count/cm | | | | |
| Warp | 24.0 | 20.5 | 19.5 | 27.0 |
| Weft | 22.0 | 19.5 | 19.2 | 30.0 |
| Fabric width cm | 163 | 147 | 156 | 159 |
| *Finished fabric:* | | | | |
| Thread count/cm | | | | |
| Warp | 27.5 | 23.0 | 21.0 | 32.0 |
| Weft | 24.8 | 22.0 | 20.4 | 33.0 |
| Fabric width cm | 151 | 136 | 144 | 142.5 |
| Air permeability l/dm$^2$ · min at 500 Pa | 3 | 3 | 8 | 7.5 |

The experiments entered in the Table were carried out with fabrics of polyamide 6.6 filament yarns. The treatment in the aqueous bath was carried out on a jig. The treatment temperature was 95° C.

The low value for air permeability obtained undergoes no significant change in the aging test recommended for air bag fabrics by motor car manufacturers. In this test, the fabric is stored at 105° C. for 100 hours and is then subjected to a test for air permeability.

Additional thermofixing is not necessary. The experiments carried out even showed that thermofixing produces no further reduction in air permeability but, on the contrary, an increase. The thermofixing recommended for technical fabrics in the present state of the art is thus a damaging process step for fabrics which are required to have a low air permeability.

When the fabric according to the invention is used in the contact part of the air bag, the advantages of the fabric are manifested in a more reliable air bag system which is improved in essential features compared with previous systems and conforms to the specifications of motor car manufacturers and is thus saleable. The term "air bag system" is used here to denote the air bag itself, its accommodation in the motor vehicle and the control system for releasing the air bag function.

EXAMPLE 1

Polyamide 6.6 filament yarns having a titre of 350 f 72 were made up into a fabric with linen weave. The yarn had a hot air shrinkage (determined at 160° C.) of 8.2%. The thread count was 24/cm in the warp and 23/cm in the weft.

The fabric was subjected to a wet treatment at 90° C. on a jig and then dried at 150° C. The drying time was 30 seconds. The residual moisture of the fabric after drying was 4.8%.

The fabric thus prepared was found to have an air permeability of 7.5 l/dm$^2$.min at 500 Pa test difference pressure.

EXAMPLE 2

The fabric produced according to Example 1 was subjected to a wet treatment near boiling point (97° C.) on a jig. The fabrics thus treated were dried for 30 seconds at 130° C., 150° C., 170° C. and 190° C. The following air permeabilities were measured in the fabrics obtained:

| Temperature of drier °C. | Air permeability: l/dm$^2$ · min at 500 Pa test difference pressure |
|---|---|
| 130 | 6 |
| 150 | 6.5 |
| 170 | 8 |
| 190 | 21 |

Another section of fabric from this experiment was dried at 170° C. for different dwell times. The following air permeabilities were obtained:

| Dwell time at 170° C. sec | Air permeability: l/dm$^2$ · min at 500 Pa test difference pressure |
|---|---|
| 15 | 5.5 |
| 30 | 8 |
| 45 | 15 |
| 60 | 19 |

The experimental results given here clearly show that no reduction in air permeability but an increase occurs at higher drying temperatures. Thermofixing occurs at higher temperatures. The same applies to prolonged dwell times when relatively high drying temperatures are employed.

This proves that the thermofixing recommended in the present state of the art for technical fabrics which are required to have a low air permeability is not only unnecessary but harmful.

EXAMPLE 3

A fabric according to Example 1 was subjected to wet treatment on an HT jig. The treatment temperature was 138° C. The drying conditions were those mentioned in Example 1.

The air permeability determined on the fabric obtained was 4.5 l/dm$^2$.min at 500 Pa test difference pressure.

What is claimed is:

1. A process for the production of uncoated technical fabrics with low air permeability, said process comprising:
   providing polyamide filament yarns having a hot air shrinkage of 6–15% determined at 160° C. according to ASTM D4974;
   weaving said yarns to form a densely woven fabric having an at least substantially symmetrical fabric construction, and a density of at least about 71%, as determined by Walz's formula for determining density;
   decreasing the air permeability of said densely woven fabric by wet-treating said densely woven fabric in an aqueous bath in a temperature range of from 60° to 140° C.; and
   drying said wet-treated fabric, wherein said process is conducted without thermofixing said fabric, to obtain an uncoated technical fabric having a low air permeability.

2. A process according to claim 1, wherein said filament yarns are polyamide filament yarns.

3. A process according to claim 1, wherein said temperature range is from 90° to 140° C.

4. A process according to claim 1, wherein said temperature range is from 90° to about 100° C.

5. A process according to claim 1, wherein said decreasing produces an air permeability of said technical fabrics which is less than 10 l/dm$^2$.min at 500 Pa test difference pressure.

6. A process according to claim 1, wherein said wet treating is carried out in a machine for open width washing.

7. A process according to claim 1, wherein said decreasing is carried out in a jig.

8. A process according to claim 1, wherein said decreasing produces an air permeability of said technical fabrics which ranges from about 40 to about 80 $l/dm^2$.min at 500 Pa test difference pressure.

9. A process for producing an article requiring low air permeability comprising:

providing an uncoated technical fabric according to the process of claim 1, and forming an article having low air permeability from the uncoated technical fabric.

10. The process of claim 9, wherein said article is an airbag.

11. The process of claim 9, wherein said article is a parachute.

12. The process of claim 9, wherein said article is sail cloth.

13. The process of claim 9, wherein said air permeability is less than 10 $l/dm^2$.min at 500 Pa test difference pressure.

14. The process of claim 9, wherein said air permeability ranges from about 40 to about 80 $l/dm^2$.min at 500 Pa test difference pressure.

15. The process of claim 1, wherein the drying of said fabric is carried out at a temperature not higher than 160° C.

16. A process according to claim 1, conducted without calendering.

\* \* \* \* \*

UNITED STATES PATENT AND TRADEMARK OFFICE
CERTIFICATE OF CORRECTION

PATENT NO.   : 5,581,856
DATED        : December 10, 1996
INVENTOR(S)  : Wolf Krummheuer, Hans A. Graefe and Volker Siejak It is certified that error appears in the above-indentified patent and that said Letters Patent is hereby corrected as shown below:

Column 6, lines 59-60, delete.
Column 7, line 3, change "decreasing" to --wet treating--.

Signed and Sealed this

Thirteenth Day of May, 1997

Attest:

BRUCE LEHMAN

*Attesting Officer*            *Commissioner of Patents and Trademarks*